Oct. 24, 1944.  F. F. CARPENTER  2,361,175
MIRROR COMPASS
Filed Jan. 5, 1943
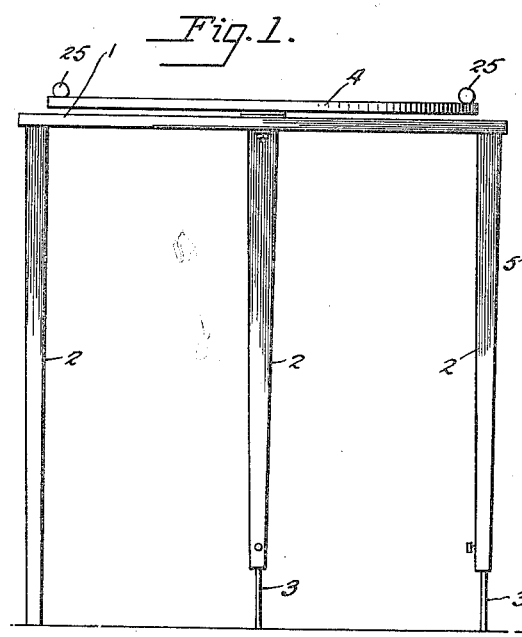
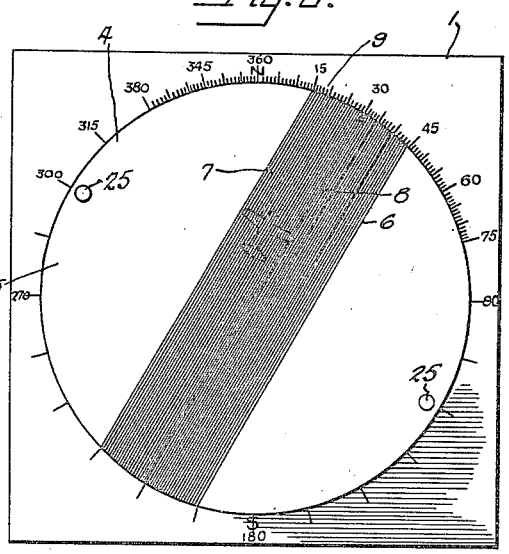
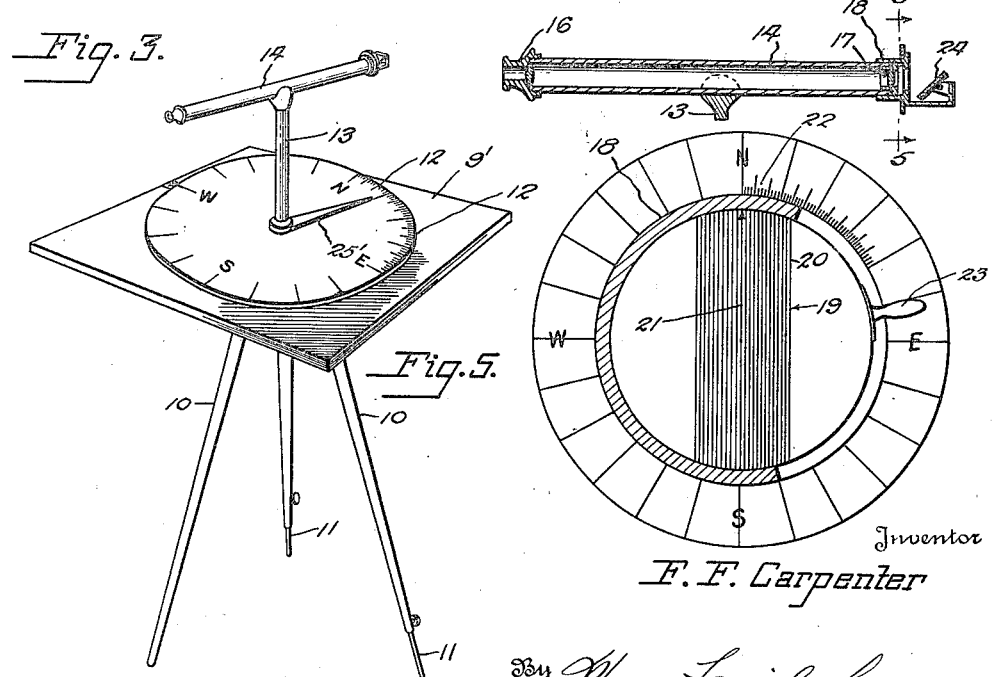
Inventor
F. F. Carpenter
By Mason Fenwick & Lawrence
Attorneys Patented Oct. 24, 1944

2,361,175

UNITED STATES PATENT OFFICE 2,361,175

MIRROR COMPASS

Francis F. Carpenter, Norfolk, Va.

Application January 5, 1943, Serial No. 471,354

1 Claim. (Cl. 88—1)

This invention relates to an instrument which for convenience may be termed a mirror compass, for determining the deviation of the magnetic compass carried by aircraft, and having other fields of usefulness in connection with aircraft.

Due to the restricted sizes of the fuselage of airplanes, or the cabins of lighter-than-air craft, it is impossible to place iron or steel bodies sufficiently remote from the magnetic compass to avoid material deviation of the compass needle. For example, the bomb load carried by an airplane may be counted upon to cause an appreciable deviation, and bomb loads of different size or weight produce different deviations. It is, therefore, necessary before an aircraft undertakes an extended navigational flight to determine compass deviation for that particular flight. By previously known methods this has been a time-consuming operation, particularly stupendous where a large number of airplanes are to be sent out together on a task flight.

The subject invention provides a simple method and means for accurately determining compass deviation in a minimum of time.

The general object of the invention is to provide a rotatable member having a grid of spaced parallel lines thereupon, capable of composing an image of a moving aircraft with the view of the grid so that the rotatable member may be turned to bring one or more of the parallel lines into substantial coincidence with the longitudinal axis of the image of the aircraft. The course of the airplane according to the airplane compass being known, and its course represented by the direction of the lines of the grid being compared with a true magnetic scale of courses, the deviation of the aircraft compass for that particular course is readily determined.

Another object of the invention is the employment of the instrument of the subject invention as an indicator of the degree of accuracy in practice dive-bombing, and for other kindred uses.

In the drawing which accompanies and forms a part of the following specification:

Figure 1 is a side elevation of a mirror compass embodying the principles of the invention;

Figure 2 is a plan view;

Figure 3 is a perspective view showing a modified form of the invention;

Figure 4 is a longitudinal vertical section through the telescope and appurtenant parts of that form of the invention shown in Figure 3; and Figure 5 is a vertical section taken along the line 5—5 of Figure 4.

Referring now in detail to the several figures, and first adverting to that form of the invention shown in Figures 1 and 2, the numeral 1 represents a planiform table supported upon the three legs 2, two of which have an adjustable foot 3 by means of which the table may be leveled. A disk 4 is rotatably mounted upon the table 1. The disk 4 is provided with a mirror surface 5, and with a broad band or grid 6 of closely spaced lines 7 parallel to the diameter of the disk and one of which lines, particularly the line 8, passes through the center of the disk. The width of the grid 6 is immaterial to the invention. The parallel lines may, if desired, extend over the entire surface of the disk or any lesser part thereof. The disk is conveniently rotated by means such as the knobs 25. The table 1 is provided with a circular scale 9, contiguous to the periphery of the disk 4 and in reading proximity to the ends of the lines 7. Said scale is divided into degrees and multiples thereof, and preferably has the diametrically opposite north and south indicia thereon.

The table is adapted to be set up with the north and south line in the direction of true magnetic north. This may readily be done by placing a magnetic compass on the table remote from any object which would cause deviation.

When the table has once been thus set up on the ground or on a vessel, it may remain as a more or less permanent fixture, that is to say, it need not be disturbed for a number of tests. When it is desired to test the deviation of an airplane compass, the pilot is instructed to fly his plane toward the instrument on a number of predetermined courses by the compass of his aircraft. Usually, he is instructed to fly courses clear around the compass.

As the aircraft approaches, the observer on the ground catches the image of the airplane in the mirror surface of the disk 4 and turns the disk so as to bring the lines of the grid 6 parallel to the longitudinal axis of the image of the airplane. As a check, the pilot may radio the course which he is flying by his compass. The object of having a plurality of parallel lines is to provide for drift of the aircraft. It takes a moment or two to make the observation, in which time the aircraft may make appreciable lateral drift so that the image moves transversely or obliquely across the grid 6. The width of the band of parallel lines permits the disk 4 to be turned to bring the longitudinal axis of the plane into coincidence with any one of the parallel lines at the moment overshadowed by the image of the airplane. The true magnetic course of the airplane is that figure on the scale 9 to which the diametrical line 8 of the grid points. The course by the pilot's compass being known, and the true magnetic course being known, the deviation of the pilot's compass is readily determined. Inasmuch as deviation varies for different courses, it is customary to have the pilot fly a number of specified courses around the instrument.

One of the advantages of the disk 4 with mirrored surface 5 is that it is not necessary for the aircraft to fly directly above the instrument in order for its image to be observed, for the observer has a wide range of movement of the eye to bring it into the angle of reflection of the image.

As an example of the use of this instrument in practice dive-bombing on training fields, it may be stated that it is customary to provide a target in the form of a white ring on the field seventy-five or more feet in diameter. The instrument illustrated in Figures 1 and 2 may be set up at the center of this target and the pilot may dive for the target. He need not drop any missiles whatsoever, but merely give a signal such as a light flash at the end of the dive, at the moment when the bombs are supposed to be dropped. As he comes down in the dive, the observer turns the disk 4 to bring the lines 7 and 8 parallel with the course of the image over the mirrored surface of the disk. If the pilot's course for an appreciable time before the signal flash is given is parallel to the diametrical line 8, it is obvious that his stick of bombs will straddle the center of the target this being considered a hit. If the longitudinal axis of the image of the plane parallels one of the lines laterally of the diametrical line 8, it is obvious that the stick of bombs will miss the center of the target.

Referring now to that form of the invention shown in Figures 3 and 4, a table 9' which may be similar to the table 1 in Figure 1 is mounted upon a tripod 10, two legs of which have the adjustable foot 11 so that the table 9' may be leveled. Any other equivalent support is within the purview of the invention. The table has a circular scale or compass rose 12, from the center of which a vertical standard 13 rises, said standard being rotatable in an azimuthal direction. A telescope 14 is fixedly mounted on the standard 13, to swing in a plane parallel to that of the table 9'. The telescope may have the usual eyepiece 16 and the objective lens 17. In the form of the invention shown, a sleeve 18 is rotatably mounted over the objective end of the telescope, having a grid 19 of parallel lines 20, extending across the objective end of the telescope, one of said lines 21 passing through the axis of rotation of the sleeve 18. A scale 22, fixed with respect to the telescope, in a plane perpendicular to the axis thereof, surrounds the grid 19 in a reading proximity to the ends of the lines 20 and 21. The sleeve 18 is provided with a handle 23 by means of which the grid 19 can be rotated. A mirror 24 is hingedly supported at the front of the objective end of the telescope. The standard 13 is provided with a pointer 25' rotatable therewith adjacent the table 9 and having its outer end in reading proximity to the scale 12.

In operation, the table 9 is positioned with the north, south line of the scale 12 in the direction of true magnetic north. The airplane whose compass is being tested for deviation flies in on a prescribed course. The telescope is turned in azimuth to catch the image of the plane in the mirror 24 and reflect it through the telescope so that a composite view of the image and grid 19 is observed through the eyepiece. The pointer 25' will then indicate the approximate course of the airplane. The grid is then turned to bring one of the lines 20 or 21 into coincidence with the longitudinal axis of the airplane. The point on the scale 22 to which the diametrical line 21 of the grid points, represents the angle of correction which must be applied to either side of the angle on the scale 12 indicated by the pointer 25' to obtain the true magnetic course of the airplane. By comparing this course with the prescribed course, flown by the aircraft according to the aircraft compass, the deviation of the aircraft compass is determined.

The above description discloses two structurally different modifications in which the novel principles of the invention may be embodied, from which it is obvious that many mechanical arrangements may be devised without deviating from the spirit and scope of the invention which is defined in the appended claim.

What I claim as my invention is:

Apparatus for determining the deviation of an airplane compass while the airplane is in flight on a determined compass course, comprising a table adapted to be leveled, and on said table a circumferential scale of compass headings, a standard rotatably mounted on said table at the center of said scale perpendicular to the plane of said table having a pointer at its lower end and a telescope at its upper end, both fixedly related thereto to rotate parallel to the plane of said table, said pointer being of such length as to refer proximately to said compass heading scale, a transparent member overlying the objective end of said telescope rotatable about the axis of said telescope in a plane perpendicular thereto carrying a grid of closely spaced lines extending thereacross on both sides of a diameter of said member and parallel thereto, a fixed annular scale of compass headings surrounding said member in proximity to the ends of said grid with the north and south line of said annular scale perpendicular to the plane of said table, and a tiltable mirror mounted in front of said grid adapted to reflect the image of the airplane in flight, through said grid.

FRANCIS F. CARPENTER.